Figures 1, 2:
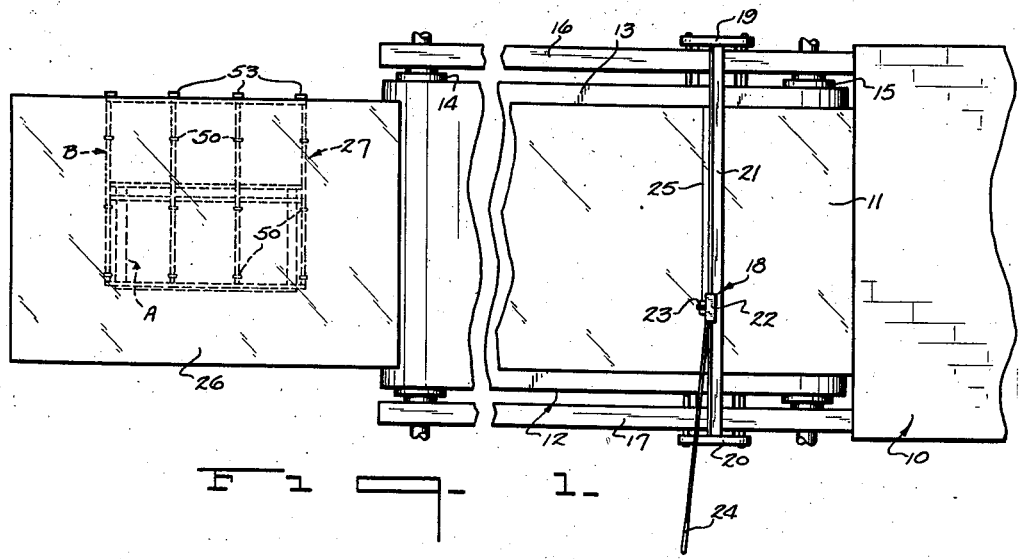

Jan. 25, 1938. J. H. MOLLER 2,106,573
SHEET GLASS HANDLING APPARATUS
Filed Feb. 20, 1936 3 Sheets-Sheet 1

Inventor
JOHN H. MOLLER.

By Frank Fraser
Attorney

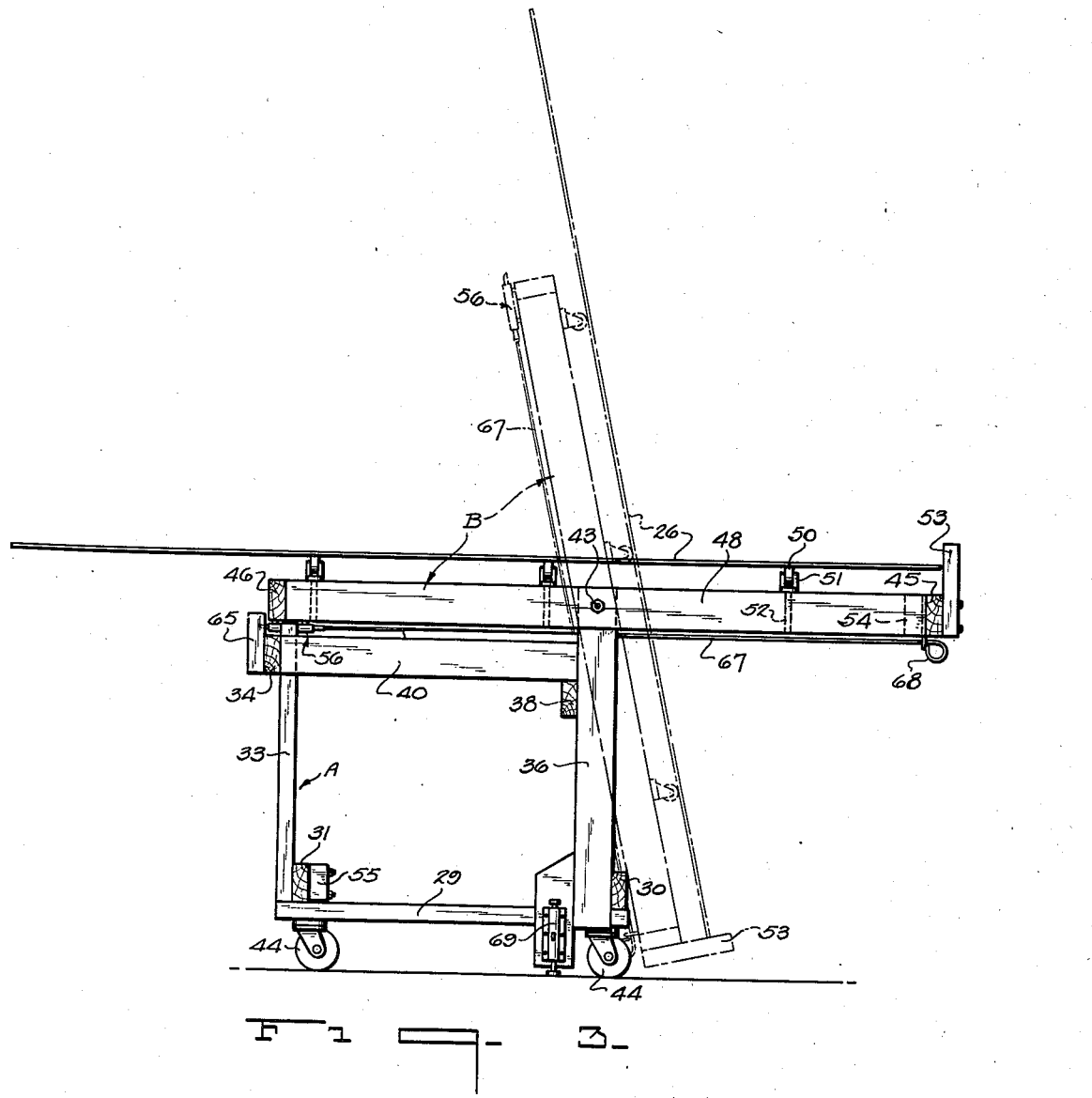

Jan. 25, 1938.    J. H. MOLLER    2,106,573
SHEET GLASS HANDLING APPARATUS
Filed Feb. 20, 1936    3 Sheets-Sheet 3
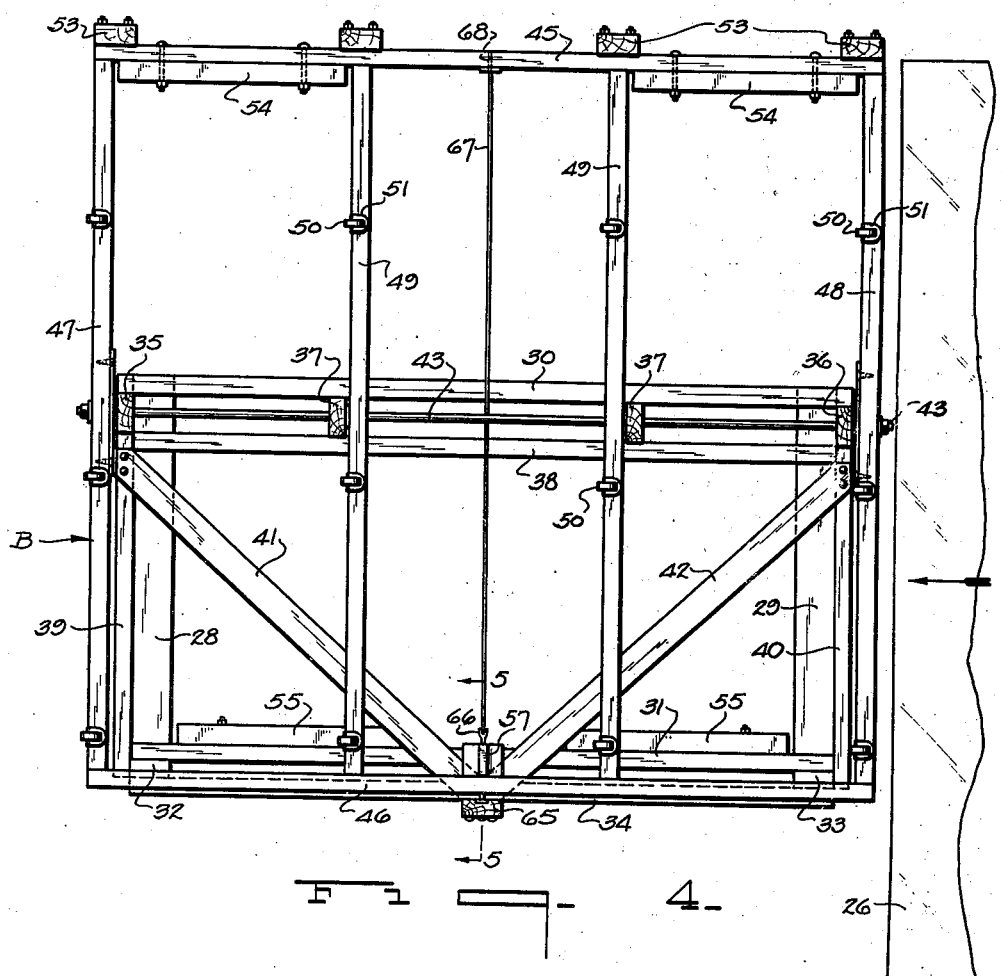
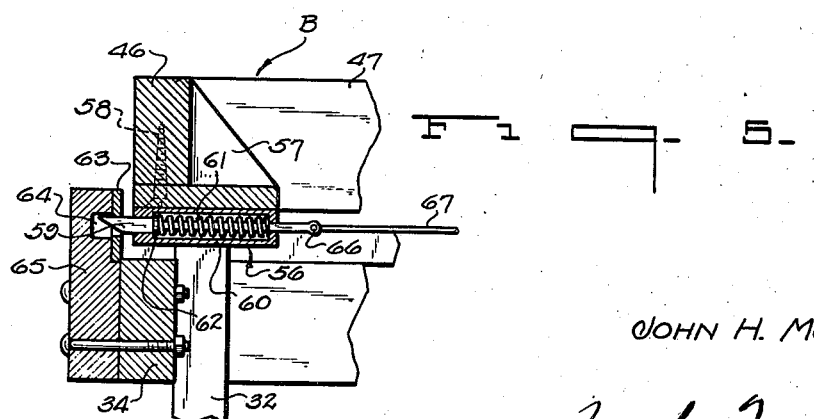
Inventor
JOHN H. MOLLER.
By Frank Fraser
Attorney Patented Jan. 25, 1938

2,106,573

UNITED STATES PATENT OFFICE 2,106,573

SHEET GLASS HANDLING APPARATUS

John H. Moller, Charleston, W. Va., assignor to Libbey-Owens-Ford Glass Company, Toledo, Ohio, a corporation of Ohio Application February 20, 1936, Serial No. 64,823

8 Claims. (Cl. 214—130)

The present invention relates to improvements in glass handling apparatus and more particularly to apparatus for handling relatively large sheets or plates of glass.

In the production of continuous sheet glass according to certain well known processes, the continuous sheet or ribbon of glass, after being formed, is carried horizontally through an annealing leer and emerges therefrom onto a so-called capping table upon which the said sheet or ribbon is cut transversely into sheet sections and upon which the opposite side edges of the individual sheet sections may also be trimmed off if desired.

The aim of this invention is the provision of a glass handling apparatus of relatively simple yet compact and durable construction for receiving the individual sheet sections horizontally from the capping table, moving said sections to an upright position, and transporting them to any desired location in the plant for further treatment or for packing.

Other objects and advantages of the invention will become more apparent during the course of the following description when taken in connection with the accompanying drawings.

In the drawings wherein like numerals are employed to designate like parts throughout the same, Fig. 1 is a diagrammatic plan view of glass handling apparatus constructed in accordance with the present invention and shown in position to receive the individual sheet sections from the capping table, Fig. 2 is a side elevation of the glass handling apparatus, Fig. 3 is an end view thereof, Fig. 4 is a plan view of the apparatus, and Fig. 5 is a detail section taken substantially on line 5—5 of Fig. 4.

With reference to the drawings and particularly to Fig. 1, 10 designates the outlet end of a horizontal annealing leer of any conventional or preferred construction and 11 a continuous sheet or ribbon of glass emerging therefrom. Positioned closely adjacent the outlet end of the leer, in a manner to receive the glass sheet therefrom and carry it forwardly, is a moving cutting or capping table 12 which travels in the same direction and at the same speed as the continuous sheet 11. This table may take a variety of different forms but is here shown, by way of example, as comprising an endless belt 13 trained about spaced rollers or drums 14 and 15 which are rotatably supported at their opposite ends by the horizontal supporting members 16 and 17, one of said rollers or drums being positively driven in any preferred manner to move the endless belt in the proper direction and at the desired speed.

As the continuous sheet or ribbon of glass 11 emerges from the leer 10 upon capping table 12, it is adapted to be cut transversely into individual sheet sections of the desired length and for this purpose there may be provided the cutting mechanism designated in its entirety by the numeral 18. This cutting mechanism may be of any conventional or approved construction since the specific structural details thereof form no part of the present invention. The cutting mechanism may, however, be of the general type disclosed in the patent to J. L. Drake, 1,724,261, August 13, 1929, and is adapted for movement with the sheet during the transverse scoring thereof whereby to permit accurate cuts.

The cutting mechanism 18 embodies generally a pair of carriages 19 and 20 arranged at opposite sides of the endless capping table 12 and movable longitudinally thereof upon suitable tracks (not shown) but which are located beneath the upper horizontal flight of said table. Extending transversely across the table and connecting the carriages 19 and 20 is a supporting cross member 21 upon which is slidably mounted a cutter carrier 22 carrying the cutter 23. The cutter carrier 22 and cutter 23 are movable along the cross member 21 by an operating rod 24, and upon drawing of the said cutter across and in contact with the continuous sheet 11, it is adapted to effect the transverse scoring thereof as indicated at 25. The glass ribbon is then broken along the score line 25 in the well known manner to provide individual sheet sections, one of which is shown at 26. If desired, the opposite longitudinal side edges of the sheet can also be trimmed off upon the capping table 12.

Positioned at the outer end of the capping table 12 to receive the glass sheet 26 therefrom and to transport it to any desired location in the plant is the improved handling apparatus provided by the present invention and designated in its entirety by the numeral 27. This handling apparatus includes generally a movable or portable carriage or truck A upon which is mounted a tilting frame or rack B which is adapted to receive the glass sheet 26 thereon while disposed in a horizontal position as indicated by the full lines in Fig. 3, after which it is swung to an upright position as shown by the broken lines and while in this position is moved to any desired location in the plant.

The carriage A consists of a substantially rectangular supporting frame comprising the spaced horizontal end members 28 and 29 connected together at one end by the horizontal side member 30 and adjacent their opposite ends by the horizontal side member 31. Secured to the side member 31, adjacent the opposite ends thereof, are uprights 32 and 33 which are connected together adjacent their upper ends by a horizontal connecting beam 34. Secured to the side member 30, adjacent the opposite ends thereof, are uprights 35 and 36 and a plurality of intermediate uprights 37 are also secured to said member between the ends thereof. All of the uprights 35, 36 and 37 are connected together adjacent their upper ends by a horizontal connecting beam 38.

Extending between and secured to the uprights 32 and 33 and the horizontal connecting beam 38 are transverse cross pieces 39 and 40 and the carriage may be further strengthened by brace boards 41 and 42 secured at one end to the cross pieces 39 and 40 and at their opposite end to the horizontal connecting beam 34.

The uprights 35, 36 and 37 project upwardly beyond the cross pieces 39 and 40 and passing therethrough is a rod 43 upon which the tilting frame or rack B is carried. The carriage A is mounted upon wheels 44 arranged at the four corners thereof and carried by the end members 28 and 29 whereby the said carriage can be freely moved about to transport the glass to any desired point.

The tilting frame B is substantially rectangular and comprises the side members 45 and 46 and the end members 47 and 48. Extending between and carried by said side members 45 and 46 are a plurality of intermediate members 49 arranged parallel with the end members 47 and 48. The end members of the tilting frame B are arranged outwardly of the ends of carriage A and are pivotally mounted intermediate their ends upon the rod 43.

The end members 47 and 48 and also the intermediate members 49 of the tilting frame are provided with a plurality of freely rotatable rollers 50 carried by brackets 51 having vertical depending stems 52 which are loosely received within the frame members so as to permit bodily rotary movement of the rollers about vertical axes as well as permitting them to freely rotate about horizontal axes.

The tilting frame B is normally maintained in a horizontal position, as shown by the full lines in Fig. 3, to receive the glass sheet thereupon from the capping table, and after the sheet is received thereon the said frame is tilted to move the said sheet to an upright position as indicated by the broken lines. When in this position, the glass sheet is supported on edge upon blocks 53 carried by the side member 45.

The frame B is also provided with counterweights 54 which act to normally swing the same to upright position, while counterweights 55 are carried by the carriage A to offset the weights 54.

As pointed out above, the tilting frame B is disposed in a horizontal position when receiving the glass sheet thereon and is adapted to be secured in such position by a latch arrangement 56 shown more particularly in Fig. 5. The latch is carried by a bracket 57 which is secured to the bottom of the side member 46 of the tilting frame by screws or the like 58, said latch including a horizontal bolt 59 slidable within a casing 60 and normally urged outwardly by a compression spring 61 encircling said latch bolt within said casing, the forward movement of the bolt being limited by a shoulder 62 formed thereon. When in extended locking position, as shown in Fig. 5, the bolt projects through an opening in the latch plate 63 and is received within a recess 64 in block 65 carried by beam 34.

The latch bolt 59 projects beyond the opposite end of the casing 60 and has pivoted thereto as at 66 an operating rod 67 which is provided at its forward end with a handle portion 68. When the tilting frame B is moved to horizontal position, it will be locked in such position by the latch bolt 59. However, when it is desired to swing the frame to its upright position, it is simply necessary for the operator to grasp handle 68 and pull rod 67 forwardly, thereby withdrawing the latch bolt 59 from locking position whereupon the counterweights 54 will act to automatically swing the frame upon rod 43 to upright position.

The carriage A, if desired, can also be provided at each end thereof with a conventional type of door stop or check 69 for maintaining the carriage in proper position during the receiving of the glass sheet upon the tilting frame or its removal therefrom. Since these stops may be of any well known type readily obtainable on the market, it is not considered necessary to either illustrate or describe in detail the construction and operation thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for handling glass sheets, a movable carriage, a tilting frame freely pivoted to said carriage and adapted to assume either a horizontal position or an upright position, and means acting to normally move the frame to and maintain it in its upright position by gravity when a glass sheet has been received thereon.

2. In apparatus for handling glass sheets, a portable wheeled carriage, a tilting frame freely pivoted to said carriage and swingable to assume either a horizontal position or an upright position, and counterweights carried by said frame acting to normally swing the same to and maintain it in upright position by gravity when a glass sheet has been received thereon.

3. In apparatus for handling glass sheets, a movable carriage, a tilting frame freely pivoted to said carriage and adapted to assume either a horizontal position or an upright position, means for locking said frame in horizontal position, and means for causing said frame to move by gravity to its upright position upon the release of said locking means when a glass sheet has been received upon said frame.

4. In apparatus for handling glass sheets, a portable wheeled carriage, a tilting frame freely pivoted to said carriage and swingable to assume either a horizontal position or an upright position, means carried by said frame and engaging said carriage for locking the said frame in horizontal position, and counterweights carried by the frame for causing said frame to assume its upright position by gravity upon the release of said locking means when a glass sheet has been received upon said frame.

5. In apparatus for handling glass sheets, a sheet conveying carriage mounted for unrestricted horizontal movement, a tilting frame freely pivoted intermediate its ends to said carriage and adapted to assume either a horizontal position or an upright position, and freely rotatable rollers carried by said frame for receiving a moving sheet of glass thereon while the said frame is in a horizontal position, said rollers being also mounted for bodily rotary movement about vertical axes.

6. In apparatus for handling glass sheets, a sheet conveying carriage mounted for unrestricted horizontal movement, a tilting frame pivotally carried by said carriage and adapted to assume either a horizontal position or an upright position, freely rotatable rollers carried by said frame for receiving a moving sheet of glass thereon while the said frame is in a horizontal position, said rollers being also mounted for bodily rotary movement about vertical axes, and means for locking the carriage in sheet receiving position.

7. In apparatus for handling glass sheets, a sheet conveying carriage mounted for unrestricted horizontal movement, a tilting frame pivoted to said carriage and adapted to assume either a horizontal position or an upright position, means carried by said frame for receiving a moving sheet of glass thereon while the said frame is in a horizontal position, means for locking the frame in horizontal position, counterweights carried by the frame for causing said frame to assume its upright position upon the release of said locking means when a glass sheet has been received upon said frame, and means for locking the carriage in sheet receiving position.

8. In apparatus for handling glass sheets, a sheet conveying carriage mounted for unrestricted horizontal movement, a tilting frame freely pivoted to said carriage and adapted to assume either a horizontal position or an upright position, means carried by the frame for receiving a moving sheet of glass thereon while said frame is in a horizontal position, means carried by the frame and engaging said carriage for locking said frame in horizontal position, counterweights carried by the frame for causing said frame to assume its upright position by gravity upon the release of said locking means when a glass sheet has been received upon the frame, and means associated with the carriage for locking said carriage in sheet receiving position.

JOHN H. MOLLER.